United States Patent [19]

Urushibata

[11] Patent Number: 4,624,013
[45] Date of Patent: Nov. 18, 1986

[54] LINKED COMPONENT EXTRACTION CIRCUIT FOR IMAGE PROCESSOR

[75] Inventor: Yukio Urushibata, Tokyo, Japan

[73] Assignee: Kabushiki Kaisha Toshiba, Kawasaki, Japan

[21] Appl. No.: 716,459

[22] Filed: Mar. 27, 1985

[30] Foreign Application Priority Data

Mar. 31, 1984 [JP] Japan ............... 59-63684

[51] Int. Cl.[4] ............................................ G06K 9/00
[52] U.S. Cl. ..................................... 382/9; 382/26; 382/48
[58] Field of Search ............... 382/9, 26, 37, 48, 56; 377/10, 11

[56] References Cited

U.S. PATENT DOCUMENTS 4,069,411  1/1978  Morton ............................. 382/26
4,183,013  1/1980  Agraawala et al. ............... 382/26
4,189,711  2/1980  Frank ............................... 382/26

FOREIGN PATENT DOCUMENTS 57-6620  2/1982  Japan .

Primary Examiner—Leo H. Boudreau
Attorney, Agent, or Firm—Cushman, Darby & Cushman

[57] ABSTRACT

A linked component extraction circuit has a FIFO memory for sequentially storing information pairs each consisting of two label values which are generated from a linked component detector and which have a linking relationship therebetween, and for reading out a currently oldest information pair when the FIFO memory is subjected to read access. A read/write unit reads out storage data (i.e., the label value) from a memory area of the table memory at an address accessed by the first label value of the information pair or the readout output data and writes the second label value of the information pair read out from the FIFO memory at the same address. The storage data read out from the table memory at the address accessed by the first label value is compared with the first label value by a comparator to generate a coincidence or noncoincidence signal. When noncoincidence is detected by the comparator, the storage data is used as the address for read/write operation of the read/write unit until the next coincidence signal is generated by the comparator. When coincidence is detected by the comparator, the next information pair is read out from the FIFO memory, and the above operation is repeated.

12 Claims, 43 Drawing Figures

FIG. 4A
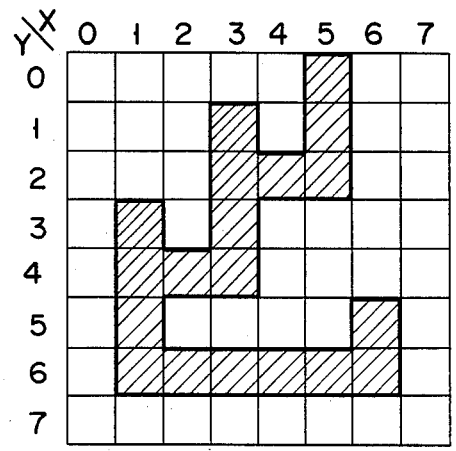
FIG. 4B
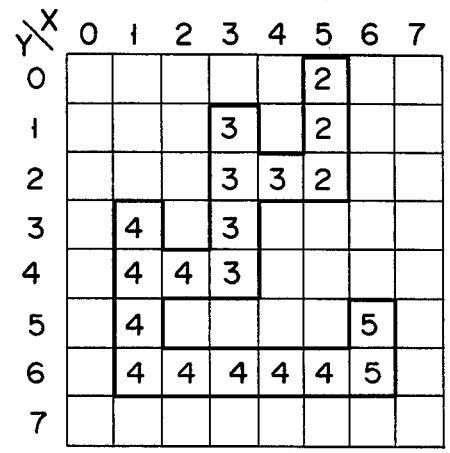
FIG. 4C
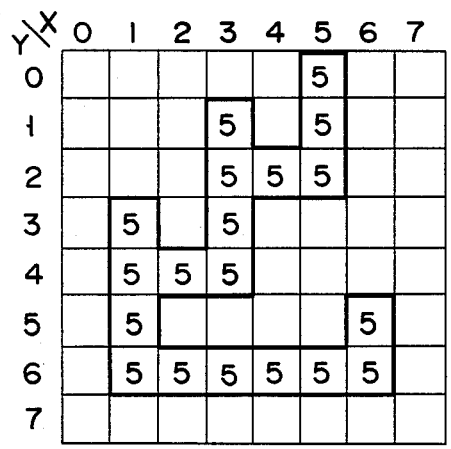
FIG. 5
| A | B | C |
|---|---|---|
| (x-1, y-1) | (x, y-1) | (x+1, y-1) |
| (x-1, y) | (x, y) | (x+1, y) |
| D | S | E |

FIG. 6A

| A | B | C |
|---|---|---|
| X | X | X |
| X | O | X |
| D | S | E |

FIG. 6B

| A | B | C |
|---|---|---|
| O | O | O |
| O | ꜀ | X |
| D | S | E |

FIG. 6C

| A | B | C |
|---|---|---|
| X | ≠O | X |
| X | ꜀ | X |
| D | S | E |

FIG. 6D

| A | B | C |
|---|---|---|
| X | O | X |
| ≠O | ꜀ | X |
| D | S | E |

FIG. 6E

| A | B | C |
|---|---|---|
| X | O | ≠O |
| ≠O | ꜀ | ꜀ |
| D | S | E |

FIG. 7A

| A = 3 | B = 0 | C = 2 |
|---|---|---|
| (3,1) | (4,1) | (5,1) |
| (3,2) | (4,2) | (5,2) |
| D = 3 | S = 1 | E = 1 |

FIG. 8A

| A = 4 | B = 0 | C = 3 |
|---|---|---|
| (1,3) | (2,3) | (3,3) |
| (1,4) | (2,4) | (3,4) |
| D = 4 | S = 1 | E = 1 |

FIG. 7B

| ADDRESS | | ADDRESS | |
|---|---|---|---|
| 0 | 0 | 0 | 0 |
| 1 | 1 | 1 | 1 |
| 2 | 2 | 2 | 2 |
| 3 | 3 | 3 | 2 |
| 4 | 4 | 4 | 4 |
| 5 | 5 | 5 | 5 |

FIG. 8B

| ADDRESS | | ADDRESS | |
|---|---|---|---|
| 0 | 0 | 0 | 0 |
| 1 | 1 | 1 | 1 |
| 2 | 2 | 2 | 2 |
| 3 | 2 | 3 | 2 |
| 4 | 4 | 4 | 3 |
| 5 | 5 | 5 | 5 |

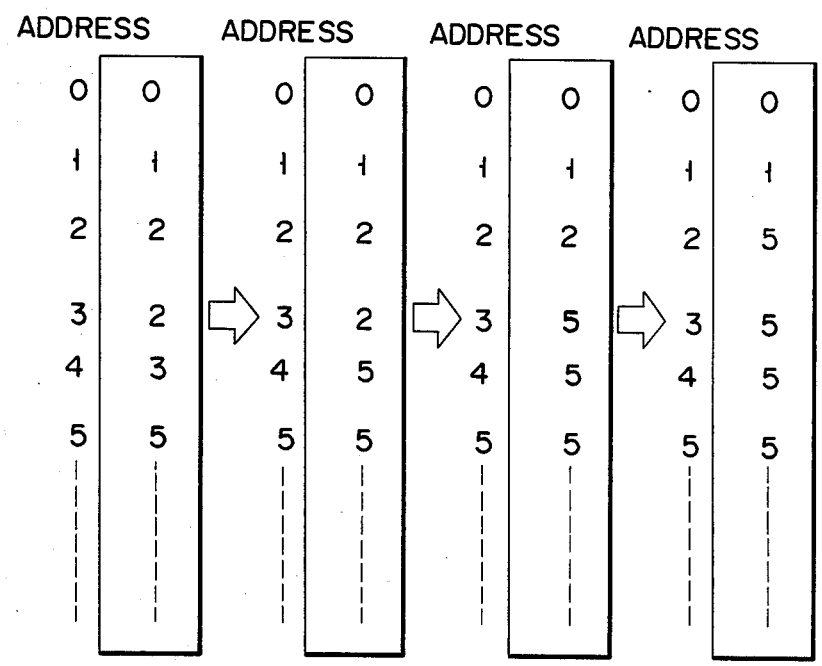

FIG. 12

TABLE MEMORY 28

| ADDRESS | INITIAL VALUE | BEFORE RELABELLING | RELABELLING PROCEDURE | RELABELLED |
|---|---|---|---|---|
| 2 | 2 | →10 | →6→3→3→2→[2] | 2 |
| 3 | 3 | →3 | →2→[2] | 2 |
| 4 | 4 | →9 | →9→4→[3] | 3 |
| 5 | 5→4 | →9 | →4→[3] | 3 |
| 6 | 6 | →3 | →[2] | 2 |
| 7 | 7→2 | →10 | →[2] | 2 |
| 8 | 8 | →8 | →[4] | 4 |
| 9 | 9 | →9 | →4→5→[3] | 3 |
| 10 | 10 | →6 | →2→7→[2] | 2 |

LINKED COMPONENT EXTRACTION CIRCUIT FOR IMAGE PROCESSOR

BACKGROUND OF THE INVENTION

The present invention relates to a linked component extraction circuit for checking a linking state of pixels of logic "1" in a binary figure having logic values of "1" and "0" stored in a two-dimensional image memory in an image processor and for sequentially assigning numbers (labels) to the pixels of logic "1" to generate an output image.

Demand often arises in graphic processing to check the characteristics of a specific portion of a figure. For example, in an image including cells in a medical image, there is a demand for checking characteristics of a specific cell image. In this case, when numbers (labels) are assigned to areas corresponding to the cells in the image, as shown in FIG. 1, a desired cell area can be extracted by designating only the corresponding number (label).

A conventional circuit suitable for such processing is described in Japanese Patent Publication No. 57-6620 and is known as a "linked component extraction circuit comprising: a two-dimensional image memory for storing a binary image; a linked component detector for sequentially reading out pixel data from the image memory to extract a linked component of the binary image and for assigning numbers to the extracted linked components in accordance with a predetermined order; a two-dimensional multi-value memory having the same capacity as that of the binary image; means for storing the numbers at addresses of the multi-value memory which correspond to pixel positions, the numbers being assigned by the linked component detector in units of pixel data; and table memory for designating that linked components represented by two different numbers are identical when the two different numbers assigned by the linked component detector represent identical linked components". In such a linked component extraction circuit, different numbers are often assigned to pixels of identical linked components for a complicated figure. In this case, data conversion is required to assign an identical number to pixels of identical linked components. In other words, the table memory must be updated. The more the figure is complicated, the more the data updating is complicated. During data updating, the next pixel processing cannot be performed, and the processing rate is lowered, resulting in inconvenience. In addition, linked components cannot be detected at a predetermined detection rate, so "handshaking" or the like for data transfer is required. As a result, the processing rate is further lowered.

SUMMARY OF THE INVENTION

It is an object of the present invention to provide a linked component extraction circuit for an image processor, wherein linked component detection and table memory updating can be simultaneously performed, and linked component detection can be performed at a predetermined rate.

According to the present invention, the linked components can be detected while the table memory showing a linking relationship between the extracted pixels is being updated, thereby achieving high-speed labeling. Pixel data can be read out from an input image memory at a predetermined rate, and data transfer can be performed at this rate, so that "handshaking" or the like can be eliminated and, hence, further high-speed operation can be performed.

In order to achieve the above object of the present invention, there is provided a linked component extraction circuit for an image processor in an image processing system having an input image memory for storing input pixel data of a figure, an image processor for processing pixel data read out from the input image memory, and an output image memory for storing output pixel data from the image processor, comprising:

a linked component detector for extracting linked components of the pixel data sequentially supplied from the image memory and for labeling extracted linked components in a predetermined order;

a first-in first-out memory, connected to the linked component detector, for sequentially storing information pairs, each consisting of a first label value generated from the linked component detector and a second label value linked with the first label value and for generating the currently oldest information pair among the information pairs;

a table memory for storing as initial values label values (third label values) corresponding to addresses and for receiving the first label value as address data and the second label value as write data;

first read/write means for reading out the third label value from a memory area at an address of the table memory which corresponds to the first label value of the information pair read out from the first-in first-out memory and for writing the second label vlaue of the information pair read out from the table memory at the address accessed by the first label value;

comparing means for comparing the third label value read out by the first read/write means from the table memory with the second label value as read/write address data for the table memory and for detecting a coincidence between the third label value and the second label value; and second read/write means for supplying the third label value as address data to the table memory, reading out the third label value from a memory area at the address of the table memory and writing the second label value of the first-in first-out memory at the address of the table memory when the coincidence is not detected by the comparing means.

BRIEF DESCRIPTION OF THE DRAWINGS

Other objects and features of the present invention will be apparent from the following description taken in connection with the accompanying drawings, in which:

FIGS. 4A through 9B are views for explaining the operation of the apparatus shown in FIG. 2, in which FIG. 4A shows a labeled input image of interest, FIG. 4B shows a labeled processed image corresponding to the input image shown in FIG. 4A, FIG. 4C shows an output image after data conversion;

FIG. 5 shows a table for explaining coordinates of pixel data A, B, C, D, S and E for a linked component detector shown in FIG. 3;

FIGS. 6A through 6E show tables for explaining the principle of linked component detection in the linked component extraction circuit in accordance with a value of pixel data S and values of pixel data A, B, C, D and E;

FIGS. 7A and 7B show a state of the linked component detector and label updating when pixel coordinate data (5,2) of FIG. 4A is entered;

FIGS. 8A and 8B show a state of the linked component detector and label updating when pixel coordinate data (3,4) of FIG. 4A is entered;

FIGS. 9A through 9E respectively show a state of the linked component detector and label updating when pixel coordinate data (6,6) of FIG. 4A is entered;

FIG. 12 is a table showing the relabeling procedure of the labeled pixel data stored in the memory table;

DETAILED DESCRIPTION OF THE PREFERRED EMBODIMENT

Figure 1:
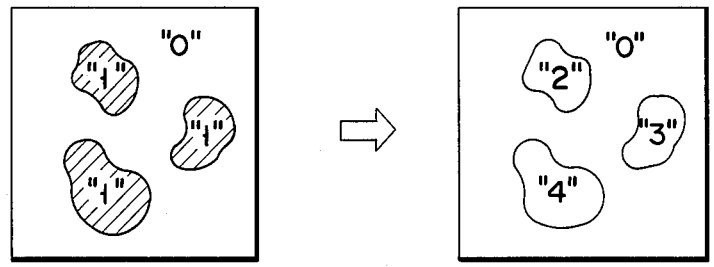
FIG. 1 is a representation for explaining conventional labeling.
Figure 2:
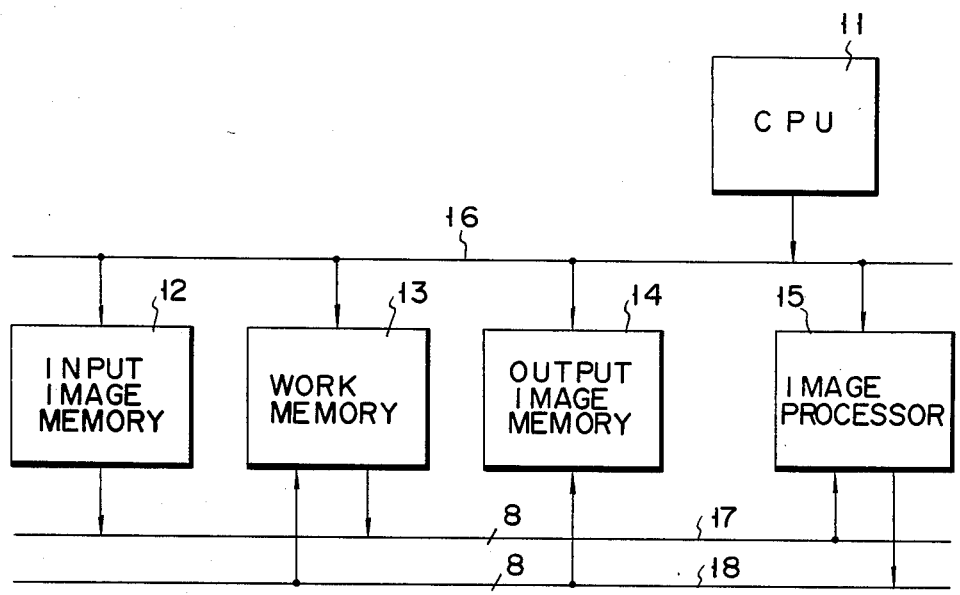
FIG. 2 is a block diagram showing a schematic system configuration of an image processing apparatus to which the present invention is applied.
Figure 3:
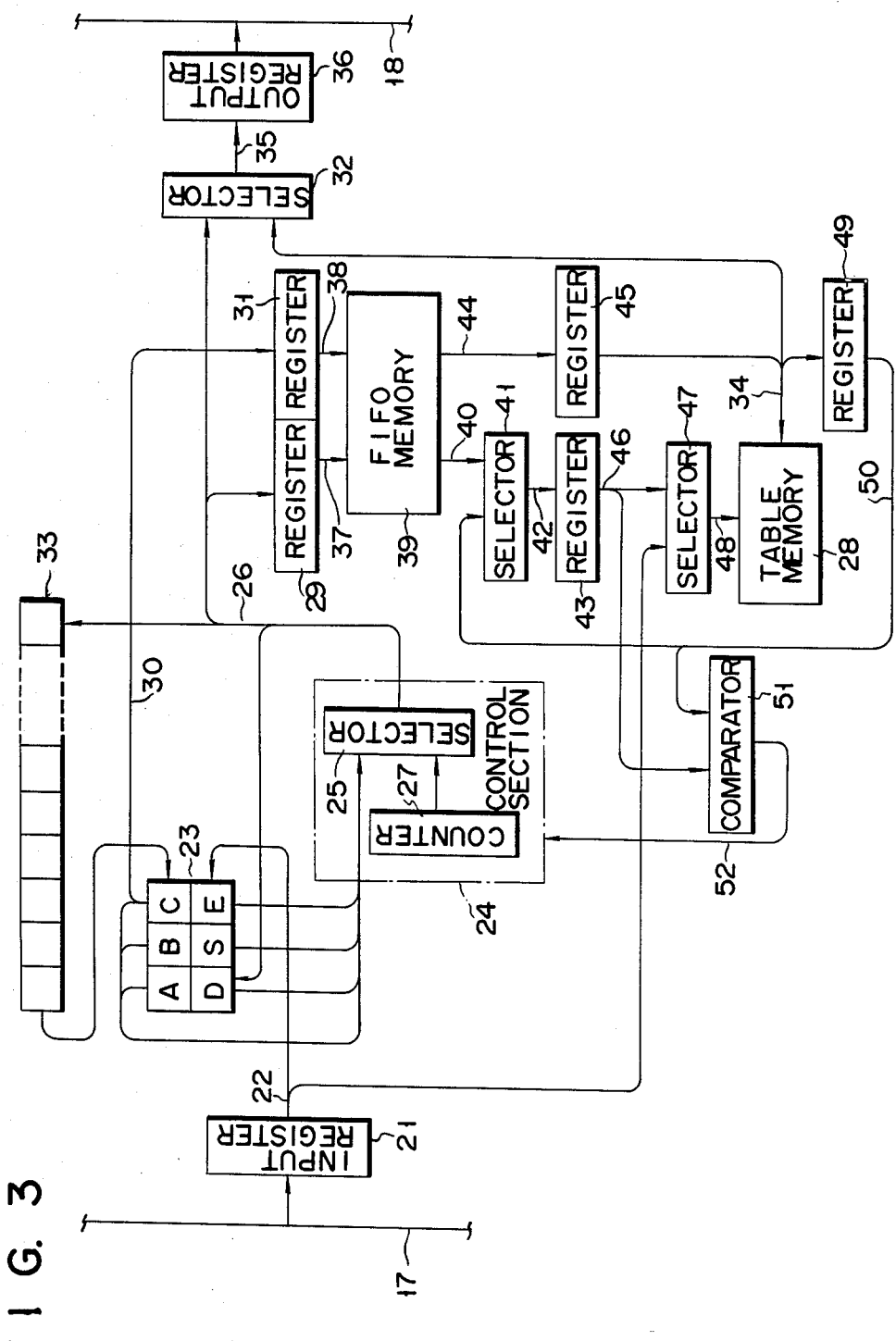
FIG. 3 is a block diagram showing a detailed arrangement of a linked component extraction circuit shown in FIG. 2.

A linked component extraction circuit according to an embodiment of the present invention will be described in detail with reference to the accompanying drawings. FIG. 2 shows the overall configuration of an image processing apparatus to which the present invention is applied, and FIG. 3 shows the internal configuration of a linked component extraction circuit 15 thereof. Referring to FIG. 2, a CPU 11 is connected to an input image memory (original image memory) 12 for storing binary image data, a work memory 13, an output image memory 14 and the linked component extraction circuit 15 through a control bus 16. The memories 12 and 13 and the extraction circuit 15 are connected to each other through, for example, an 8-bit image data bus 17. The memories 13 and 14 and the extraction circuit 15 are connected to each other through, for example, an 8-bit image data bus 18. Each of the memories 12 through 14 has a capacity of, for example, 512×512 pixels (each pixel comprises eight bits). However, as shown in FIGS. 4A through 4C, it is assumed, for the sake of explanation, that each of the memories 12 through 14 has a capacity of 8×8 pixels. FIG. 4A shows a labeled input image of interest, FIG. 4B shows the labeled processed image corresponding to the input image of interest shown in FIG. 4A, and FIG. 4C shows an output image after data conversion. In the memory, each pixel can correspond to each bit.

In labeling, pixels are read out from the memory 12 at a predetermined rate in response to an instruction from the CPU 11 shown in FIG. 2. When the pixel coordinates are given as (x,y), pixel coordinates (0,0), (1,0),. . . , (7,0), (0,1), (1,1),. . . , (7,1), (0,2), (1,2),. . . (7,7) are read out in the order named. The pixel data read out from the memory 12 is supplied to the extraction circuit 15 of FIG. 3 through the bus 17 and is latched by an input register 21 in the extraction circuit 15. The pixel data latched by the register 21 is supplied to a linked component detector 23 through a signal line 22. The detector has a 3×2 mask configuration (A, B, C, D, S, E). The pixel data from the line 22 is set in the E portion. When the content of the E portion comprises the pixel data at point (x+1,y), the contents of the A, B, C, D and S portions of the detector 23 are (x−1,y−1), (x,y−1), (x+1,y−1), (x−1,y) and (x,y), respectively, as is apparent from FIG. 5.

The respective pixel data in the A through E portions of the detector 23 are supplied to a control section 24 through the illustrated signal lines. The control section 24 checks the pixel data from the A through E portions and labels the pixel of the S portion which is given as the pixel of interest for linked component detection.

A four-linking detection system will be briefly described with reference to FIGS. 6A through 6E wherein labeling is performed for a given pixel with respect to any one of the four adjacent pixels. Referring to FIGS. 6A through 6E, reference symbol "X" indicates "0", "1" or any other value. Referring to FIG. 6A, when the data of the S portion which is subjected to labeling is set to "0", i.e., when no pixel of a high level is present, the control section 24 controls a selector 25 therein and selectively sends the data of interest (i.e., the pixel value "0" of the S portion) as an output pixel (i.e., the labeled pixel) onto a signal line 26.

As shown in FIG. 6B, when the pixel value of the S portion is set to "1" and the pixel values of the A, B, C and D portions are set to "0", the pixel of the S portion is not linked with other pixels. The control section 24 generates, as a label of the pixel of the S portion, a count n (n is an integer of 2 or more) of a label counter 27 therein onto the line 26. The count of the counter 27 is incremented by one every time the output pixel is selected. The initial value of the counter 27 is "2" and is distinguished from the non-labeled data. As shown in FIG. 6C, when the pixel of the S portion is set to "1" and the pixel of the B portion is not set to "0" (i.e., the pixel of the B portion is set to be "2" or more), these pixels are linked. The control section 24 causes the selector 25 to select and generate the label of the B portion. In this case, when the pixel of the D portion is not set to "0", i.e., when the pixel of the S portion is also linked with that of the D portion in addition to that of the B portion, the label of the D portion can also be selected in principle. In this embodiment, the label of the B portion is selected as in the above case. As shown in FIG. 6D, when the pixel of the S portion is set to "1", the pixel of the B portion is set to "0" and the pixel of the D portion is not set to "0", i.e., when the pixel of the S portion is linked with that of the D portion, the control section 24 causes the selector 25 to select and generate the label of the D portion. In this case, as shown in FIG. 6E, when the pixels of the C and E portions are not set to "0", the control section 24 determines that a linked figure is provided but the C and D portions are assigned with different labels. Furthermore, as shown in FIG. 6E, in order to allow updating of a table memory 28 to be described later, the control section 24 causes the output pixel data on the line 26, i.e., the pixel data of the D portion to be set in a register 29 and the pixel data of the C portion in a register 31 through a signal line 30.

The pixel data appearing on the line 26 under the control of the control section 24 is also supplied to the D portion of the detector 23, a selector 32, and an image buffer 33. The buffer 33 comprises a shift buffer having a shift length which is the same as the X-direction length of each of the memories 12 through 14. The buffer 33 stores the output pixel data appearing on the line 26, i.e., one-line labeled pixel data. The selector 32 selectively generates either data supplies from the selector 25 through the line 26 or data supplied from the table memory 28 through a data line 34. In labeling, the selector 32 selects and generates the data supplied through the line 26 in response to an instruction from the CPU 11. The data selectively generated from the selector 32 is supplied to an output register 36 through a signal line 35. In the buffer 33 and the detector 23, data is shifted in units of pixels in synchronism with an input cycle of the pixel data from the bus 17, i.e., in synchronism with the pixel read cycle of the memory 12. As a result, in the detector 23, the contents of the B, C and E portions are set in the A, B and S portions, respectively. The D portion receives the labeled data of the content of the S portion, i.e., the output pixel data. At the same time, the E portion receives the next new pixel data supplied from the register 21 through the line 22, and the C portion receives data from the buffer 33. The data received from the selector 25 through the line 26 is set in the last shift position of the buffer 33, thereby enabling the next labeling operation. The data selected and generated by the selector 32 and appearing on the line 26 is loaded in the output register 36 at the one-pixel shift timing. The data loaded in the register 36 is transferred to the memory 13 through the bus 18 and is written in a corresponding memory area, e.g., a memory area corresponding to the coordinates (x,y) of the memory 13 in the case of FIG. 5.

The above labeling operation is repeated to convert the binary figure of FIG. 4A to a multi-value figure of FIG. 4B.

Table memory updating which is directly associated with the scope of the present invention will be described hereinafter. Assume pixel data "1" of coordinates (5,2) in the binary figure of FIG. 4A is set in the E portion of the detector 23. In this case, the contents of the A through E portions of the detector 23 are given in FIG. 7A. The state shown in FIG. 7A belongs to the type of FIG. 6E. The control section 24 selects as the output pixel, pixel data ("3" in this case) of the D portion. This pixel data is loaded in the register 29 through the line 26. The data of the D portion is set in the last shift position of the buffer 33 and the register 36 at the same timing as the set timing for the register 29. The control section 24 also loads the pixel data ("2" in this case) of the C portion of the detector 23 in the register 31 through the line 30 at the same timing as the set timing for the register 29. The data (the contents of the D and C portions) loaded in the registers 29 and 31 are supplied to and stored in a FIFO (First-In First-Out) memory 39 through signal lines 37 and 38, respectively.

The FIFO memory 39 is read-enabled when the table memory 29 is not being updated. When the memory 39 is read-enabled, the currently oldest data among all storage data is read out therefrom. When the first data is written in the memory 39 in the above case, the first written data is read out. The data corresponding to the content of the D portion among the data read out from the memory 39 is supplied to a selector 41 through a signal line 40. While the data is being read out from the memory 39, the selector 41 selects the data appearing on the line 40 under the control of the control section 24.

The data selected and generated by the selector 41 is loaded in a register 43 through a signal line 42. The data corresponding to the content of the C portion and read out from the memory 39 is loaded in a register 45 through a signal line 44.

The data from the register 43 is supplied to a selector 47 through a signal line 46. The selector 47 selects the data appearing on the line 46 in response to an instruction from the CPU 11. The output from the selector 47 is supplied to an address terminal of the memory 28 through an address line 48. First, the table memory 28 is accessed for readout, and the label data from the memory location corresponding to the address data is read out and sent onto the data line 34. In this embodiment, the table memory 28 stores the initial values which are the same as the addresses assigned to the corresponding memory locations. For example, when the content corresponding to the pixel data of the D portion is given as "3", label data of "3" is read out from a memory area or location at address 3 of the memory 28. The label data "3" read out from the memory 28 is loaded in a register 49 through the data line 34, and the memory 28 is set in the write access mode. In this mode, the content of the register 45 is supplied to the memory 28 through the line 34 and is written in the same address accessed in the read mode described above. In the above case, the content of the memory 28 at address 3 is updated from "3" as the old label value to "2" as a new label value, as shown in FIG. 7B. The label value "2" at address 3 indicates that the pixel represented by the label value "3" is linked with that represented by the label value "2". The label value "3" indicates that data conversion to the label value "2" is required.

The content of the register 49 is supplied to the selector 41 and a comparator 51 through a signal line 50. The comparator 51 also receives the data from the register 43 through the line 46. The comparator 51 compares these data, i.e., the data read out from the memory 28 with the corresponding read address and detects a coincidence or a noncoincidence. In the above case wherein the readout data is "3" and its read address is "3", the coincidence is detected. A detection result from the comparator 51 is supplied to the control section 24 through a signal line 52. When the coincidence is detected, the control section 24 determines that table memory updating for one pixel is completed. The control section 24 supplies a data output enable signal to the memory 39. When nonprocessed data is left in the memory 39, the oldest data is read out from the memory 39, and table memory updating is performed using the readout data. However, when a non-coincidence is detected by the comparator 51, the control section 24 causes the selector 41 to select the content of the register 49 which is supplied through the line 50. The selected data is set in the register 43. A series of operations described above is repeated until the comparator 51 detects a coincidence.

The detector 23 performs labeling at the predetermined rate independently of table updating. During labeling, every time the data of the type shown in FIG. 6E is detected, the data (i.e., the pixel data of the D and C portions) appearing on the lines 26 and 30 are stored in the FIFD memory 39. For this reason, even if a long period of time is required for updating the memory 28, no problem occurs in labeling at the predetermined rate unless the FIFD memory 39 is full.

In the case shown in FIGS. 4A through 4C, the memory 28 is subjected to write access when the pixel data "1" of the coordinates (3,4) shown in FIG. 4A is set in the E portion of the detector 23, as shown in FIG. 8A. The write data (i.e., pixel data of the D and C portions) to the memory 39 are "4" and "3", respectively. The memory 28 is updated using the above pixel data in such a manner that the content or the memory 28 at address 4 is updated from "4" to "3", as shown in FIG. 8B.

In the the case shown in FIGS. 4A through 4C, the table 28 is also subjected to write access when the pixel data "1" of the pixel coordinates (6,6) of FIG. 4A is set in the E portion of the detector 23. The data (i.e., pixel data of the D and C portions) written in the memory 39 are "4" and "5", respectively. The table memory 28 is updated using these data in such a manner that the label value "3" at address 4 is updated to "5". The comparator 51 detects that the old label value "3" read out from the memory location at address 4 does not coincide with its read address. The read address "3" is supplied to the memory 28 through the register 49, the selector 41, the register 43 and the selector 47 to read out the label value "2" at address 3 and write the label value "5" from the register 45 at the same address, as shown in FIG. 9D. The comparator 51 detects that the old label value "2" at address 3 does not coincide with its read address. In the same manner as described above, the content (i.e., the label value "2") is read out from the memory area at address 2, and the label value "5" from the register 45 is written at the same address, as shown in FIG. 9E. The comparator 51 detects that the label value "2" read out from the memory area at address 2 coincides with its read address. A coincidence signal from the comparator 51 is supplied to the control section 24 through the line 52, thereby completing updating of the memory 28.

A linked component extraction circuit according to another embodiment of the present invention will be described with reference to FIGS. 10 to 15.

Figure 10:
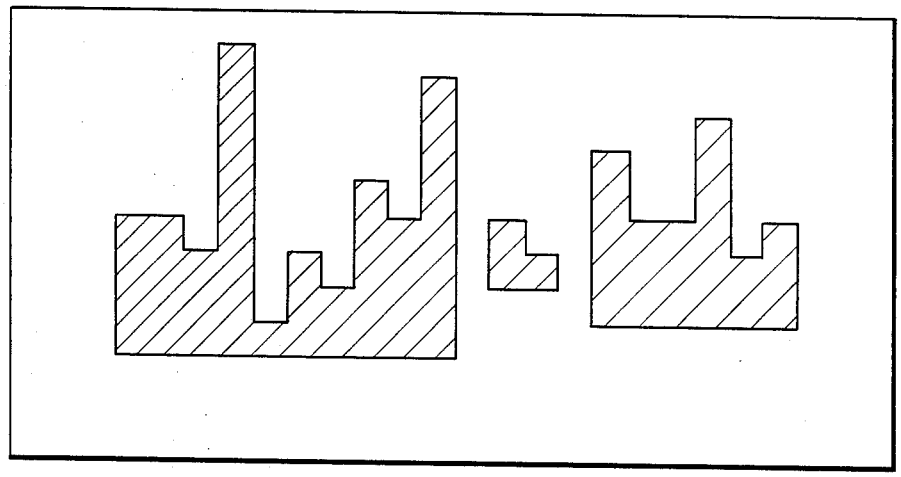
FIG. 10 is a representation showing another image pattern of the present invention.
Figure 11:
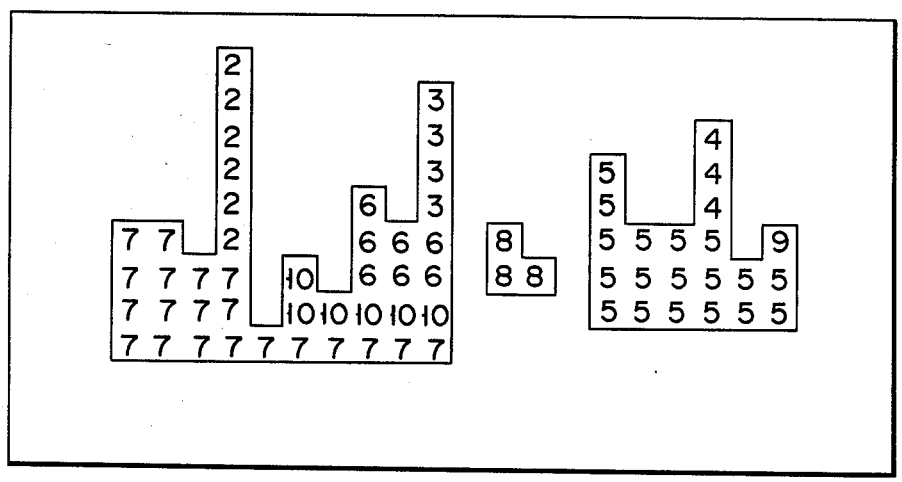
FIG. 11 is a representation showing labeled pixel data of the pattern of FIG. 10.

FIG. 10 shows another image information pattern. When the image information shown in FIG. 10 is labeled by the circuit of FIG. 3, the label data of the image are shown in FIG. 11. The labeling procedure can be readily understood from the above description and will not be repeated. Unlike the case shown in FIG. 4, the same label is not assigned to the linked pixels even if relabeling is to be performed. The contents of a table memory 28 are pixel data before relabeling, as shown in FIG. 12. In this state, the contents of the memory 28 represent the linked pixels but do not indicate the end of labeling. For this reason, the labeled data stored in the memory 28 must be relabeled. The relabeling procedure will be described below.

Figure 13:
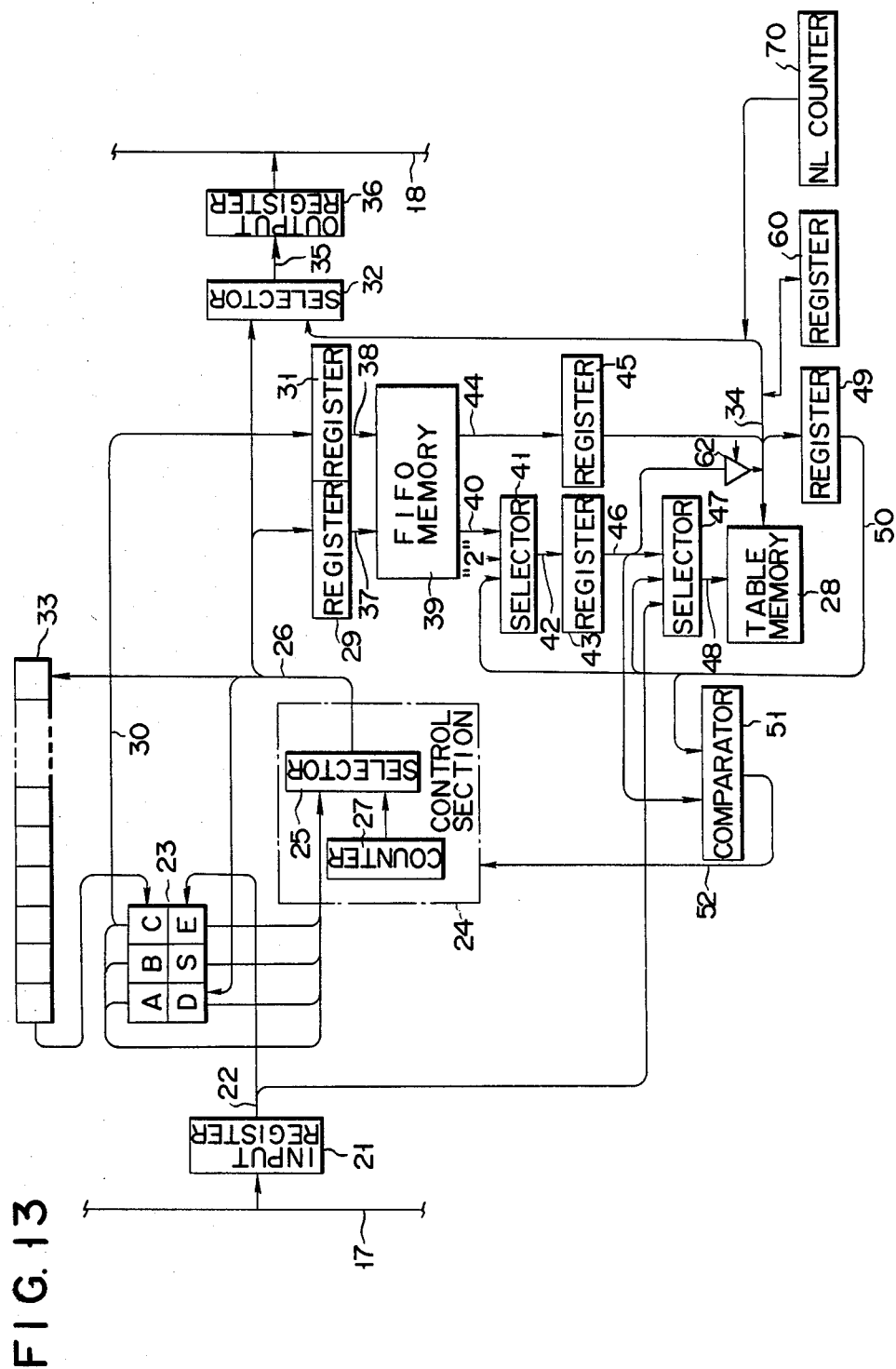
FIG. 13 is a block diagram of a relabeling procedure circuit according to another embodiment of the present invention.

FIG. 13 shows a circuit arranged by adding a relabeling section to the circuit of FIG. 3. The relabeling section comprises a register 60 for storing data read out from the memory 28, an input line for connecting a signal line 50 of a register 49 to a selector 47, an NL counter 70 for counting a new label, and a gate circuit 62 for supplying data from a register 43 to the memory 28 through a signal line 46. In addition, a selector 41 receives a constant "2", and the register 43 has a counter function.

The relabeling procedure using the circuit of FIG. 13 will be described hereinafter.

Figure 14:
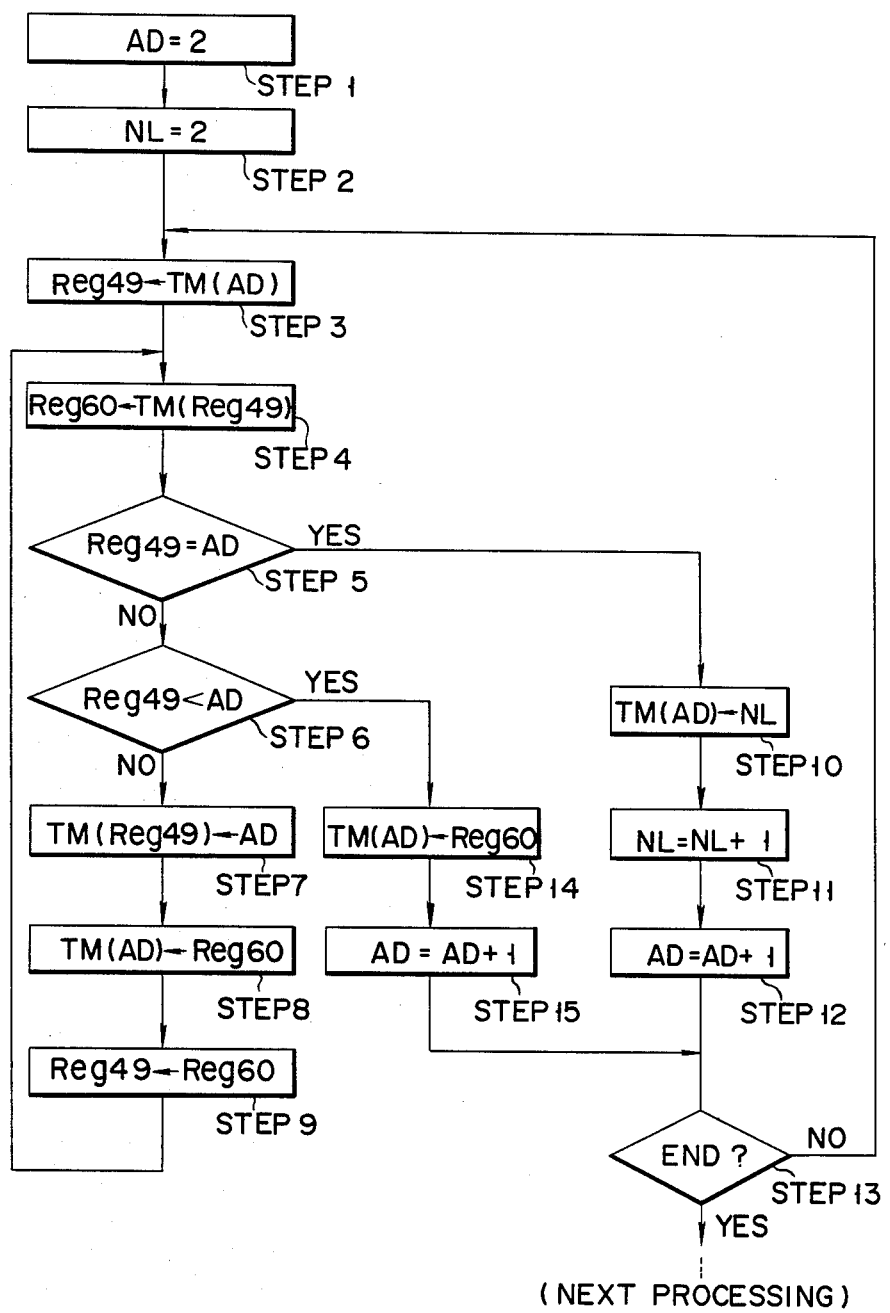
FIG. 14 is a flow chart for explaining the operation of the control section during relabeling.
Figure 15A:
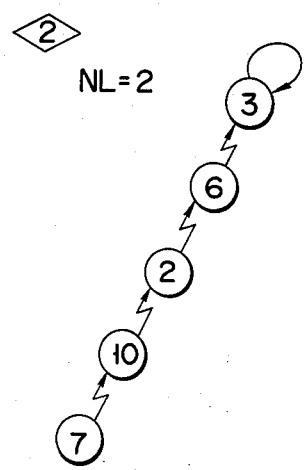
FIGS. 15A through 15Q are representations for explaining the relabeling procedure of the pattern of FIG. 11.
Figure 15B:
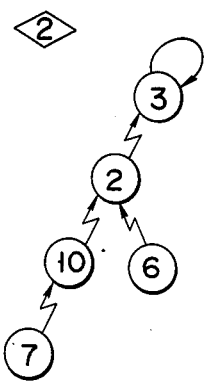
Figure 15C:
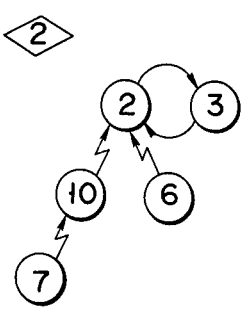
Figure 15D:
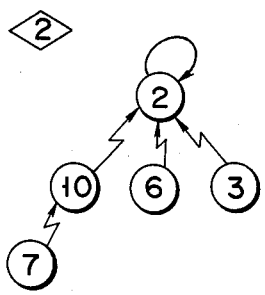
Figure 15E:
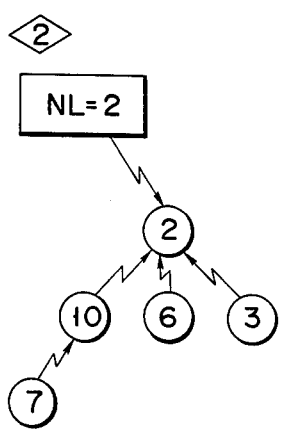
Figure 15F:
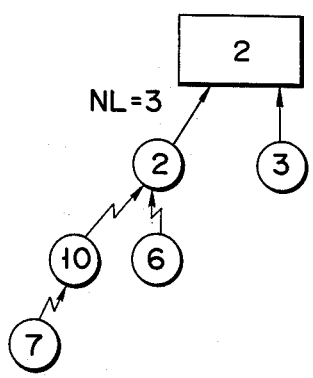
Figure 15G:
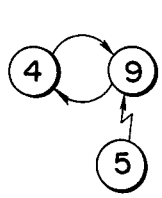
Figure 15H:
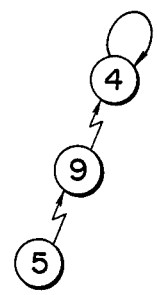
Figure 15I:
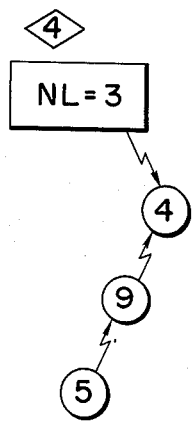
Figure 15J:
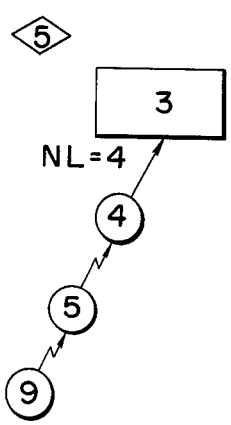
Figure 15K:
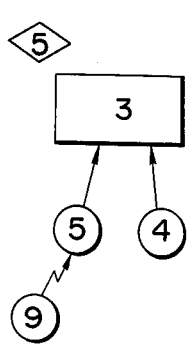
Figures 15L, 15M, 15N:
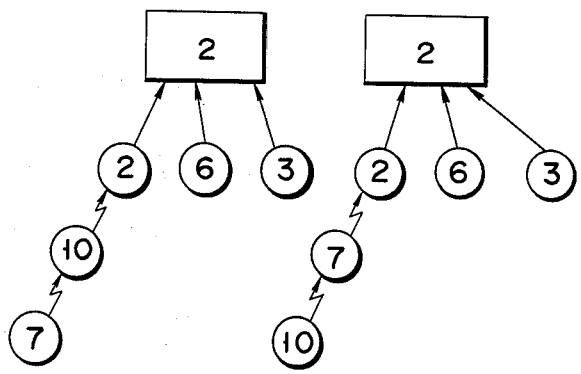
Figure 15O:
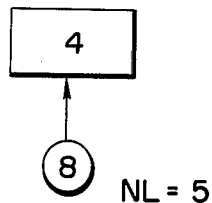
Figure 15P:
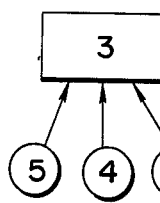
Figure 15Q:
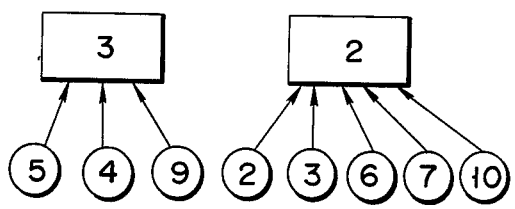

FIG. 14 is a flow chart for explaining relabeling processing steps of a controller 24. FIGS. 15A to 15Q show the relabeling procedure for the image pattern shown in FIG. 10.

In order to perform relabeling, the controller 24 causes the selector 41 to select the constant "2" so as to set an initial value address AD=2 in the register 43 of FIG. 13. An initial value NL=2 is set in the NL counter 70. The above initial loading corresponds to steps 1 and 2 of FIG. 14. A read address RD=2 set in the register 43 is coupled to the memory 28 through the selector 47. Data "10" (FIG. 12) is read out from a memory area at address 2 of the memory 28 and is stored in a register 49 (step 3). The content of the register 49 is supplied to the memory 28 through the signal line 50 and the selector 47. As a result, data "6" (FIG. 12) is read out from a memory area at address 10 of the memory 28 and is stored in the register 60 (step 4). In this case, the content of the register 49 is compared by a comparator 51 with that of the register 43 so as to determine whether or not the contents coincide with each other, or whether or not the content of the register 43 is larger than that of the register 49 (steps 5 and 6). In this case, since the contents of the registers 49 and 43 are 10 and 2, respectively, they do not coincide with each other, and the content of the register 49 is larger than that of the register 43. The flow advances to step 7. In step 7, the initial value "2" set in the register 43 is stored at address 10 of the memory 28. In this case, the linking state of label 2 (address 2) is shown in FIG. 15A wherein label 2 is determined to be linked with label 10. The initial value "2" is supplied from the register 43 to the memory 28 upon ON/OFF behavior of the gate 62 (step 7). In other words, after the data "6" stored at address 10 of the memory 28 is read out and loaded in the register 60, data AD=2 is written at address 10. The selector 47 selects the initial value "2" from the register 43 and supplies it to the memory 28. Data "6" set in the register 60 is stored at address 2 of the memory 28 (step 8). As shown in FIG. 15B, the control section 24 determines that label 2 is linked with label 6. In order to detect which label is linked with label 6 in accordance with the above routine, data "6" of the register 60 is set in the register 49 (step 9). Thereafter, the flow is looped to step 4, and data "3" (FIG. 12) is read out from a memory area at address 6 of the memory 28 in response to address data "6" set in the register 49. The readout data "3" is stored in the register 60. In steps 5 and 6, the data AD=2 of the register 43 is compared by the comparator 51 with the data "6" of the register 49. the control section 24 determines that the content of the register 49 is larger than that of the register 43. The operation in step 7 is performed again. Data "2" from the register 43 is stored in a memory area at address 6 of the memory 28 through the gate 62. The operation in step 8 is then performed again. The data "3" is stored from the register 60 to a memory area at address 2 of the memory 28. As shown in FIG. 15C, the control section 24 determines that label 3 is also linked with label 2. The flow advances to step 9 wherein the data "3" of the register 60 is set in the register 49. The flow is looped to step 4 again. In step 4, the data "3" is read out from a memory area at address 3 of the memory 28 and is stored in the register 60. Since the content of the register 49 is larger than that of the register 43, step 7 is executed through steps 5 and 6. The data "2" from the regiser 43 is stored in a memory area at address 3 of the memory 28. In step 8, the data "3" from the register 60 is stored in a memory area at address 2 of the memory 28. In step 9, the data "3" stored in the register 60 is set in the register 49. The flow is looped again to step 4. In step 4, the data "2" (processed in step 7 of the previous cycle) is read out from the memory area at address 3 of the memory 28 and is stored in the register 60. The flow advances to step 5. The operations in steps 5, 6, 7, 8 and 9 are performed again, and the flow returns to step 4 again. The data "2" is read out from the memory area at address 2 of the memory 28 in response to the address data supplied from the register 43. The readout data "2" is stored in the register 60. In step 5, the comparator 51 compares the data "2" of the register 49 with the data AD=2 of the register 43 and detects a coincidence. The flow advances to step 10. In step 10, the new label value NL=2 is stored at address 2 of the memory 28. The linking state of label 2 in the memory 28 is changed to that shown in FIG. 15E through the states of FIGS. 15C and 15D. Since the coincidence is detected in step 5, the procedure concerning address 2 of the memory 28 is completed.

In step 11, the new label in the counter 70 is incremented by one to obtain a count NL=3(=2+1). In step 12, the content of the register 43 is incremented by one and is updated to AD=3(=2+1). Data stored at address 3 of the memory 28 is accessed in response to address data supplied from the register 43. The control section 24 detects in step 13 that relabeling is not completed. The flow returns to step 3. In step 3, the data "2" is read out from the memory area at address 3 of the memory 28 and is set in the register 49. In step 4, the data "2" is stored at address 2 of the memory 28 in response to the address data supplied from the register 49. In step 5, the comparator 51 detects that the data "2" of the register 49 does not coincide with the data "3" of the register 43, and the flow advances to step 6. In step 6, the data AD=3 of the register 43 is larger than the content of the register 49, and the flow advances to step 14. In step 14, the data "2" of the register 60 is stored again at address 3 of the memory 28. In other words, the content at address 3 of the memory 28 is determined in step 14, thereby obtaining the state of FIG. 15F. In step 15, the address data of the register 43 is incremented by one to obtain AD=3+1=4. The flow returns to step 3 again through step 13.

The same processing as described above is performed for the content stored at address 4 of the memory 28. Data "9" is read out from a memory area at address 4 of the memory 28 in step 3 and is stored in the register 49. Data "9" is read out from a memory area at address 9 of the memory 28 and is stored in the register 60 in step 9. Data "4" of the register 43 is written at address 9 of the memory 28 in step 7 through steps 5 and 6, thereby obtaining the state of FIG. 15G. In step 8, the data "9" of the register 60 is stored at address 4 of the memory 28. The data "4" is read out from the memory area at address 9 of the memory 28 and is stored in the register 60 through steps 9 and 4. The data "4" of the register 43 is stored at address 9 of the memory 28 in step 7 through steps 5 and 6. In step 8, the data "4" of the register 60 is stored at address 4 of the memory 28. Label 4 is relabeled to the state shown in FIG. 15H. The data "4" is read out from the memory area at address 4 of the memory 28 and is stored in the register 60 again through steps 9 and 4. In the next step 5, the data "4" of the register 49 coincides with the data of the register 43, and the flow advances to step 10. In step 10, label value "3" from the counter 60 is written at address 4 of the memory 28. As shown in FIG. 15I, label "4" is updated to new label "3". The operations in steps 11 and 12 are executed. The count of the counter 70 is incremented by one to update the label to new label NL=3+1=4, and the content of the register 43 is incremented by one to update the address to AD=4+1=5. The flow returns to step 3.

In step 3, data "9" is read out from a memory area at address 5 of the memory 28 and is stored in the register 49. In the next step 4, the data "4" is read out from the location at address 9 of the memory 28 and is stored in the register 60. Thereafter, in step 7, the data "5" of the register 43 is stored at address 9 of the memory 28. The data "4" of the register 60 is stored at address 5 of the memory 28. In other words, label 9 is replaced with label 5, as shown in FIG. 15J. Thereafter, in step 4, data "3" is read out from the memory area at address 4 of the memory 28 and is stored in the register 60. In step 6, since the data "5" of the register 43 is larger than the data "4" of the register 49, the flow advances to step 14. In step 14, the data "3" of the register 60 is stored at address 5 of the memory 28. Old label 5 is updated to new label 3, as shown in FIG. 15K. In step 15, the address AD of the register 43 is incremented by one and is updated to AD=5+1=6.

The same operation is performed for the data stored at address 6 of the memory 28. In step 3, data "2" is read out from a memory area at address 6 of the memory 28 and is stored in the register 49. The data "2" is read out from the memory at address 2 of the memory 28 and is stored in the register 60. In step 6, the control section 24 determines that the address AD=6 of the register 43 is larger than the data "2" of the register 49. The flow then advances to step 14. In step 14, the data "2" of the register 60 is stored at address 6 of the memory 28 to update old label 6 to new label 2, thereby obtaining a linking state shown in FIG. 15L. In step 15, the address AD of the register 43 is incremented by one and is updated to AD=6+1=7. The flow returns to step 3 again.

In step 3, data "10" is read out from a memory area at address 7 of the memory 28 and is stored in the register 49. In step 4, data "2" is read out from a memory area at address 10 of the memory 28 and is stored in the register 60. Thereafter, step 7 is executed through steps 5 and 6. In step 7, the data "7" of the register 43 is stored at address 10 of the memory 28, and the state shown in FIG. 15M is obtained. In step 8, the data "2" of the register 60 is stored at address 7 of the memory 28, and the flow advances to steps 9 and 4. In step 4, the data "2" is read out from the location at address 2 of the memory 28 and is stored in the register 60. In the next step 6, since the address AD=7 of the register 43 is larger than the data "2" of the register 49, the flow advances to step 14 again. The data "2" of the register 60 is stored at address 7 of the memory 28, and old label 7 is updated to new label 2, as shown in FIG. 15N.

In step 15, the address AD of the register 43 is incremented by one and is updated to AD=7+1=8. After step 13 is executed, the flow returns to step 3.

In step 3, data "8" is read out from a memory area at address 8 of the memory 28 in response to the address data supplied from the register 43 and is stored in the register 49. In step 4, the data "8" is read out from the memory area at address 8 of the memory 28 in response to the address data supplied from the register 49 and is stored in the register 60. The control section 24 determines in step 5 that the data "8" of the register 49 is equal to the address AD=8 of the register 43, and the flow advances to step 10. In step 10, new label 4 of the counter 70 is written at address 8 of the memory 28, so that old label 8 is updated to new label 4, as shown in FIG. 15O.

In step 11, the count NL of the counter 70 is incremented by one and is updated to NL=4+1=5. In step 12, the address AD of the register 43 is incremented by one and is updated to AD=8+1=9. After step 13 is performed, the flow returns to step 3 again.

In step 3, data "5" is read out from the memory area at address 9 of the memory 28 and is stored in the register 49. In step 4, the data "3" is read out from the memory area at address 5 of the memory 28 and is stored in the register 60. After step 5 is executed, the control section 24 determines in step 6 that the address AD=9 of the register 43 is larger than the data "5" of the register 49. The flow advances to step 14. In step 14, the data "3" of the register 60 is stored at address 9 of the memory 28. Old label 9 is updated to new label 3, as shown in FIG. 15P.

In step 15, the address AD of the register 43 is incremented by one and is updated to AD=9+1=10. The flow advances to step 3 after step 13 is executed. In step 3, data "7" is read out from a memory area at address 10 of the memory 28 and is stored in the register 49. In step 4, data "2" is read out from a memory area at address 7 of the memory 28 and is stored in the register 60. The control section 24 determines in step 6 that the address AD=10 of the register 43 is larger than the data "7" of the register 49, and the flow advances to step 14. In step 14, the data "2" of the register 60 is stored at address 10 of the memory 28. Old label 10 is updated to new label 2, as shown in FIG. 15Q. Thereafter, in step 15, the address AD of the register 43 is incremented by one and is updated to AD=10+1=11. In this embodiment, since the address area of the memory 28 has addresses upto address 10, the end of relabeling is detected in step 13.

As is apparent from the above description, relabeling can be simply performed by the circuit of FIG. 13 at high speed.

When labeling and table memory updating are completed for one picture, the apparatus shown in FIG. 2 is set in a data conversion mode. In this mode, the data (i.e., the labeled pixel data) stored in the memory 13 are sequentially read out onto the bus 17 at the same rate and in the same order as in data read access of the memory 12. The data sequentially read out from the memory 13 and appearing on the bus 17 are latched by the register 21 in the extraction circuit 23 for every predetermined interval. The data latched by the regiter 21, i.e., the data read out from the memory 13 is supplied to the selector 47 through the line 22. In the data conversion mode, the selector 47 is switched to select the data appearing on the line 22 in response to an instruction from the CPU 11. As a result, the data appearing on the line 22 is selected by the selector 47 and supplied to the address input terminal of the memory 28 through the line 48. The memory 28 is accessed for read operation, and the storage data (i.e., the label value) corresponding to the address data from the line 22 is read out from the memory 28. The readout data (i.e., the label value) is supplied to the selector 32 through the line 34. In the data conversion mode, the selector 32 is switched to select the data appearing on the line 34 in response to the instruction from the CPU 11. The data is selected by the selector 32 and latched by the register 36. The latched data is transferred to the memory 14 through the bus 18 and is written in the corresponding position of the memory 14. For example, the corresponding position is point (x,y) in the memory 14 when the data read out from the memory area corresponding to (x,y) of the memory 13 is to be converted to labeled data.

When the above operation is repeated for all labeled data stored in the memory 13, the memory 14 stores properly labeled pixel data, as shown in FIG. 4C.

In the above embodiment, during table memory updating, the data supplied through the line 26 is defined as the address data and the data supplied through the line 30 is defined as the write data. However, these definitions may be reversed.

Furthermore, the linked component logic is not limited to the particular embodiment as described in Japanese Patent Publication No. 57-6620. Again, the present invention is not limited to the four-linking detection system, but can be extended to an eight-linking detection system for also dealing with obliquely linked pixels.

In the above embodiment, as shown in FIG. 4B, the pixel coordinates (6,5) and (6,6) are labeled as "5", so that data at addresses 2 through 5 are converted to "5" as shown in FIG. 9B. However, when label numbers are rearranged, the contents (i.e., label numbers) at addresses 2 to 5 are "2", as shown in FIG. 9E.

What is claimed is:

1. A linked component extraction circuit for an image processor in an image processing system having an input image memory for storing input pixel data of a figure, an image processor for processing pixel data read out from said input image memory, and an output image memory for storing output pixel data from said image processor, comprising:

a linked component detector for extracting linked components of the pixel data sequentially supplied from said image memory and for labeling extracted linked components in a predetermined order;

a first-in first-out memory, connected to said linked component detector, for sequentially storing information pairs, each consisting of a first label value generated from said linked component detector and a second label value linked with the first label value and for generating a currently oldest information pair among the information pairs;

a table memory for storing as initial values label values (third label values) corresponding to addresses and for receiving the first label value as address data and the second label value as write data;

first read/write means for reading out the third label value from a memory area at an address of said table memory which corresponds to the first label value of the information pair read out from said first-in first-out memory and for writing the second label value of the information pair read out from said table memory at the address accessed by the first label value;

comparing means for comparing the third label value read out by said first read/write means from said table memory with the second label value as read/write address data for said table memory and for detecting a coincidence between the third label value and the second label value; and second read/write means for supplying the third label value as address data to said table memory, reading out the third label value from a memory area at the address of said table memory and writing the second label value of said first-in first-out memory at the address of said table memory when coincidence is not detected by said comparing means.

2. A circuit according to claim 1, wherein labeling of said linked component detector and updating of said table memory are simultaneously performed.

3. A circuit according to claim 1, wherein labeling of said linked component detector is performed at a predetermined rate, and an output therefrom is stored in said first-in first-out memory.

4. A circuit according to claim 1, wherein said second read/write means repeats read/write access until a coincidence is detected by said comparing means.

5. A circuit according to claim 1, further comprising: a first selector, connected between said first-in first-out memory and said table memory, for receiving the first label value read out from said first-in first-out memory and the third label value read out from said table memory; a register for latching a label value selected by said first selector; and a second selector for receiving an output from said register and an external read address, an output from said second selector being supplied as address data to said table memory.

6. A linked component extraction circuit for an image processor in an image processing system having an input image memory for storing input pixel data of a figure, an image processor for processing pixel data read out from said input image memory, and an output image memory for storing output pixel data from said image processor, comprising:

a linked component detector for extracting linked components of the pixel data sequentially supplied from said image memory and for labeling extracted linked components in a predetermined order;

a first-in first-out memory, connected to said linked component detector, for sequentially storing information pairs, each consisting of a first label value generated from said linked component detector and a second label value linked with the first label value and for generating a currently oldest information pair among the information pairs;

a table memory for storing as an initial value a label value corresponding to an address number;

a first register, arranged between said first-in first-out memory and said table memory, for storing as write data the second label value supplied from said first-in first-out memory;

second and third registers, connected to said table memory, for storing data read out from said table memory;

a first selector for receiving the first label value supplied from said first-in first-out memory, the data stored in said second register and a constant, and selecting one of the first label value supplied from said first-in first-out memory, the data stored in said second register and the constant;

a fourth register, connected to said first selector, for storing output data selected by said first selector, said fourth register having a counter function;

a second selector for receiving the data stored in said fourth register, the data stored in said second register and externally supplied address data, selecting one of the data stored in said fourth register, the data stored in said second register and the externally supplied address data, and generating output data as an address signal to said table memory;

gate means for supplying as the write data to said table memory the data stored in said fourth register;

a comparator for comparing the data stored in said second register with that in said fourth register;

a new label counter for counting new labels and generating a count to said table memory; and a controller for controlling said linked component detector, said first-in first-out memory, said table memory, said first to fourth registers, said first and second selectors, said gate means, said comparator and said new label counter.

7. A circuit according to claim 6, wherein said controller causes said first selector to select the constant when relabeling is performed for the data stored in said table memory, the constant being stored in said fourth register.

8. A circuit according to claim 6, wherein the data read out from said table memory is stored in said second register when said second selector selects the data stored in the fourth register, and the data read out from said table memory is stored in said third register when said second selector selects the data stored in said second register.

9. A circuit according to claim 6, wherein when said comparator detects a noncoincidence between the data stored in said second and fourth registers, the count of said new label counter is stored in a memory area at an address of said table memory which is accessed by said fourth register, and thereafter the count of said new label counter and the data of said fourth register are incremented.

10. A circuit according to claim 6, wherein when said comparator detects that the data stored in said fourth register is larger than that stored in said second register, the data stored in said third register is written in a memory area at an address of said table memory which is accessed by said fourth register, and thereafter the data of said fourth register is incremented.

11. A circuit according to claim 6, wherein when said comparator detects that the data stored in said second register is larger than that stored in said fourth register, the data stored in said fourth register is stored in a memory area at an address of said table memory which is accessed by said second register, the data stored in said third register is stored in a memory area at an address of said table memory which is accessed by said fourth register, and then the data stored in said third register is transferred to said second register, said table memory being accessed by said second register.

12. A circuit according to claim 9 or 10, wherein read access of said table memory is restarted by using said fourth register if relabeling for all addresses of said table memory is not completed after the data of said fourth register is incremented.

* * * * *